J. F. STANLEY.
REVERSIBLE CLUTCH MECHANISM.
APPLICATION FILED JAN. 3, 1918.
1,330,822.
Patented Feb. 17, 1920.
2 SHEETS—SHEET 1.
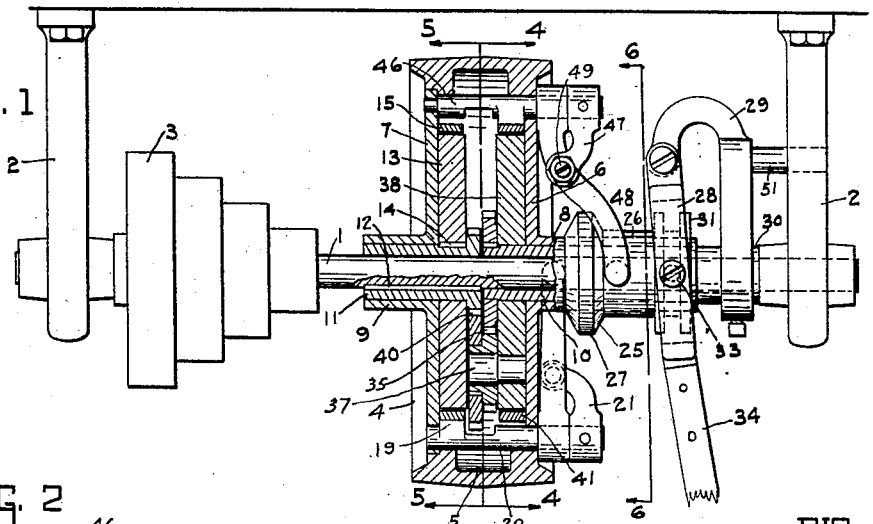
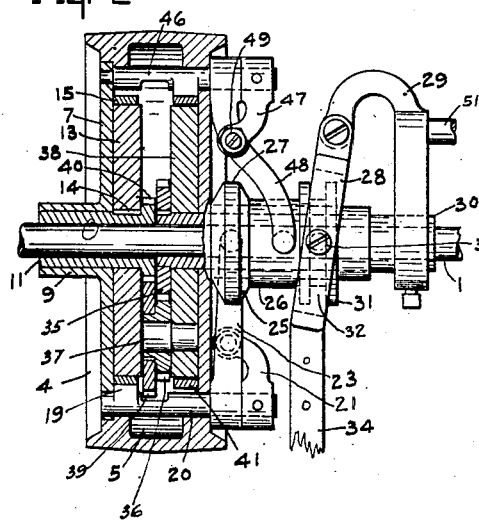
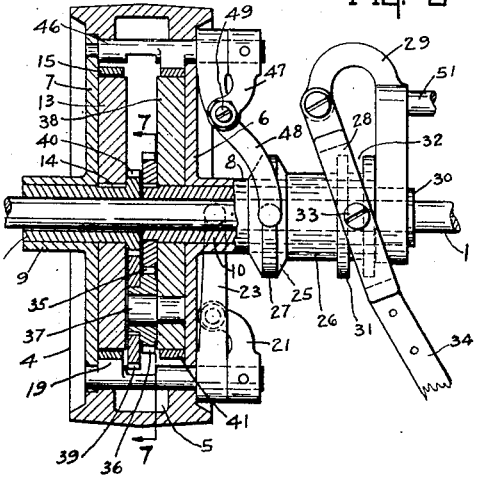
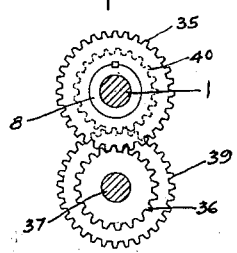
INVENTOR
JAMES F. STANLEY
BY
Lockwood & Lockwood
ATTORNEYS J. F. STANLEY.
REVERSIBLE CLUTCH MECHANISM.
APPLICATION FILED JAN. 3, 1918.
1,330,822.
Patented Feb. 17, 1920.
2 SHEETS—SHEET 2.
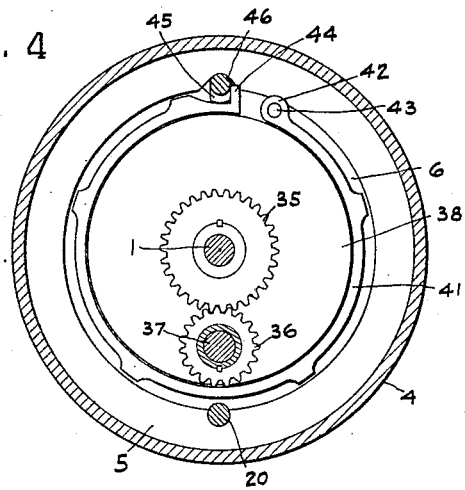
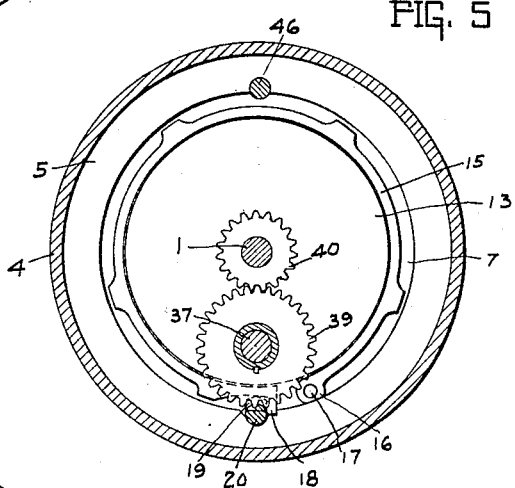
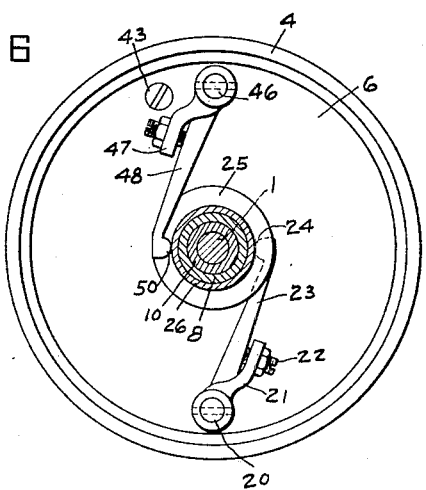
INVENTOR
JAMES F. STANLEY
BY
Lockwood & Lockwood
ATTORNEYS.

UNITED STATES PATENT OFFICE.

JAMES F. STANLEY, OF ANDERSON, INDIANA.

REVERSIBLE CLUTCH MECHANISM.

1,330,822.  Specification of Letters Patent.  Patented Feb. 17, 1920.

Application filed January 3, 1918. Serial No. 210,145.

*To all whom it may concern:*

Be it known that I, JAMES F. STANLEY, a citizen of the United States, and a resident of Anderson, county of Madison, and State of Indiana, have invented a certain new and useful Reversible Clutch Mechanism; and I do hereby declare that the following is a full, clear, and exact description thereof, reference being had to the accompanying drawings, in which like letters refer to like parts.

This invention relates to reversible clutch mechanisms and is primarily adapted for use in connection with line shafts. One feature of the invention is the provision of a belt wheel and means coöperating therewith for locking the same in connection with the line shaft. A further feature of the invention is means for coöperation with the locking mechanism for the belt wheel to reverse the rotation of the line shaft.

A further feature of the invention is the provision of means for locking or unlocking the parts of the clutch mechanism with the line shaft. A further feature of the invention is the provision of adjusting means for coöperation with the locking parts of the device. A further feature of the invention is the provision of a single means adapted to so position the parts of the clutch mechanism that the shaft will be driven in either direction or to release the clutch mechanism and permit the belt wheel to run idle.

The full nature of the invention will be understood from the accompanying drawings and the following description and claims:—

Figure 1 is a central sectional view of the clutch mechanism as applied to a line shaft with the parts of the clutch mechanism set to permit the belt wheel to run idle. Fig. 2 is a detail sectional view showing the parts set to drive the line shaft in one direction. Fig. 3 is a similar view with parts set to reverse the rotation of the line shaft. Fig. 4 is a sectional view as seen on line 4—4 of Fig. 1. Fig. 5 is a similar view as seen on line 5—5 of Fig. 1. Fig. 6 is a sectional view as seen on line 6—6 of Fig. 1, and Fig. 7 is a detail sectional view of the driving gears for reversing the rotation of the line shaft as seen on line 7—7 of Fig. 3.

Referring to the drawings in which similar reference numerals designate corresponding parts throughout the several views, 1 indicates a line shaft of the usual or any preferred construction which is usually suspended in hangers 2, said line shaft having pulleys 3 mounted thereon from which machinery or the like is driven.

Mounted upon the line shaft 1 is a belt wheel 4, which is preferably hollow to provide an inner cavity 5, one wall 6 of the belt wheel 4 being integral, while the opposite wall 7 is removably attached to the belt wheel so that access may be had to the cavity 5. The wall 6 is provided with an elongated hub 8, while the wall 7 is provided with a hub 9, the hub 8 having a sleeve 10 extending therethrough and the hub 9 having a sleeve 11 extending therethrough, the sleeve 10 being rotatably mounted on the shaft 1, while the sleeve 11 is attached to said shaft in any suitable manner by means of a key 12. In order to drive the line shaft 1 forwardly from the belt wheel 4, a disk 13 is mounted upon the sleeve 11 and secured thereto by means of a key 14 or any suitable manner, said disk being positioned adjacent the inner face of the wall 7, and coöperating with said disk 13 is a band 15, which when clamped around the disk 13 will lock the belt wheel to the disk 13 and impart rotation to the shaft 1. The band 15 is preferably constructed of spring metal and has one of its ends provided with an eye 16 for the reception of a screw or pin 17 for securing the band 15 to the wall 7. The opposite end of the band 15 which is positioned adjacent the eye 16, is provided with a shoulder 18 with which coöperates a cam 19 on the shaft 20 and when said shaft is rotated in one direction the band 15 will be drawn lengthwise and securely clamped into engagement with the disk.

One end of the shaft 20 has an arm 21 fixed thereto, said arm having a set screw 22 at its free end, said arm being so bent as to position the set screw 22 through a finger 23 which is pivotally mounted upon the shaft 20, the free end of the finger 23 having a ball point 24 for engagement with a cone 25. The cone 25 is attached to a thimble 26, which thimble is slidably mounted upon the hub 8 and is moved longitudinally to bring the ball point 24 into engagement with the peripheral edge 27 of the cone by means of a yoke 28, said yoke being pivotally mounted upon a bracket 29, which bracket is fixedly secured to a collar 30 on the shaft 1.

The thimble 26 is provided with a pair of spaced disks 31, which form a channel 32 into which extend pins 33 carried by the yoke 28, the lower end of the yoke being attached to a shifting lever 34, which lever extends downwardly in reach of the operator. The position of the various elements as when the shaft 1 is being driven forwardly is shown in Fig. 2 of the drawings.

In order to reverse the rotation of the line shaft 1 and the pulleys 3 carried thereby so as to reverse the operation of the elements being driven from the line shaft, a gear 35 is keyed to the sleeve 10, which gear meshes with a gear 36 mounted upon a stud 37, which stud is in turn carried by a disk 38 rotatably mounted upon the sleeve 10. Keyed to the gear 36 is a third gear 39, said third gear meshing with a gear 40 fixed to the sleeve 11, and when the disk 38 is rotated it will be readily seen that through the medium of said train of gears the rotation of the shaft 1 will be reversed. The disk 38 is caused to rotate with the belt wheel 4 by placing a band 41 around said disk, said band being constructed similar to the band 15 and having an eye 42 at one end through which extends a pin 43 for securing the band to the wall 6 of the belt wheel. The opposite end of the band 41 is provided with a shoulder 44 with which coöperates a cam 45 on a shaft 46 and by means of which the band is clamped into engagement with the disk 38.

The shaft 46 also extends through the wall 6 and has an arm 47 fixed thereto, which has its free end extended over a finger 48 mounted on the shaft 46, the end of the second arm 47 having a set screw 49 therethrough which may be adjusted to regulate the swinging movement of the shaft 46 and the cam thereon. The free end of the finger 48 is likewise provided with a ball point 50, which coöperates with the cone 25 in the same manner as the ball 24 of the finger 23, the finger 48 however being so constructed as to operate from the opposite side of the cone from the finger 23 and said fingers are likewise directed on opposite sides of the line shaft.

The bracket 29 may be mounted in any suitable manner and in order to hold the same from rotation on the collar 30, a pin 51 is provided on said bracket 29 which extends through the adjacent hanger 2 and thus positively holds the bracket against swinging movement.

The operation of the device is as follows: When the belt wheel 4 is to run idle the lever 34 is moved until the cone 25 is positioned as shown in Fig. 1, so that neither of the fingers 23 or 48 will be in engagement with the cone. When it is desired to drive the shaft 1 forwardly the lever 34 is swung inwardly or toward the clutch mechanism, thereby forcing the cone into engagement with the ball point 24 on the finger 23, causing said ball to ride up the incline face of the cone and rest on the periphery thereof, this action swinging the finger 23 and rotating the shaft 20, thus forcing the cam 19 into engagement with the shoulder 18 and binding the band 15 on to the disk 13. As the disk 13 is keyed to the sleeve 11 and as said sleeve is in turn keyed to the shaft 1, said shaft will be driven in the same direction as the travel of the belt wheel.

Should it be desired to reverse the travel of the line shaft 1, the lever 34 is moved in the opposite direction, or away from the clutch mechanism until the ball point of the finger 48 encounters and travels up the opposite inclined face of the cone and rests upon the periphery thereof. This action swings the finger 48 and rotates the shaft 46, thereby forcing the cam 45 against the shoulder 44 and engages the band 41 with the disk 38. This causes the disk 38 to rotate with the belt wheel 4 and as the gear 35 is stationary and the gear 36 meshing therewith is carried by the disk 38, rotating motion will be imparted to the gear 36, thereby rotating the gear 40 and the shaft 1, this action causing the shaft 1 to rotate in reverse order from the direction in which it is being driven when the disk 13 is locked into engagement with the belt wheel 4.

By providing the cavity in the belt wheel 4 practically all of the operating parts of the clutch mechanism are inclosed within the belt wheel and by placing a supply of lubricant within the cavity before the wall 7 is secured thereover, the parts will be thoroughly lubricated and undue wear of the parts thereof prevented.

Although the clutch mechanism is shown as applied to use in connection with a line shaft it will be clearly understood that the field of operation thereof is not confined to such, but may be used in connection with any machinery or shafts employing a clutch mechanism for operating the same, or where the operation of the shaft is to be reversed, and it will likewise be seen that various structural changes may be made without departing from the scope of the invention in order to adapt the same for use of the device with different classes of machinery and shafts.

The invention claimed is:

1. In a reversible clutch mechanism, the combination with a shaft, and a cone mechanism slidable thereon, of a hollow belt wheel rotatable on said shaft, disks mounted in said belt wheel, means controlled by said cone for causing one disk and the shaft to travel with the belt wheel, and means also controlled by said cone for reversing the rotation of said shaft while the belt continues rotating in the same direction.

2. In a reversible clutch mechanism, the combination with a shaft, a cone slidable thereon, and means to move said cone longitudinally, of a belt wheel rotatable on said shaft, a disk rotatable on said shaft, means operable by said cone for causing said disk to rotate with said belt wheel, means for causing said shaft to rotate in opposition to the rotation of the belt wheel, a second disk fixed to said shaft, and means also operable by said cone for causing the second disk to rotate with said belt wheel, and cause said shaft to rotate with said belt wheel.

3. In a reversible clutch mechanism, the combination with a shaft, a cone slidable on the shaft, and means to manually operate said cone, of a hollow belt wheel, a pair of disks within said belt wheel, a pair of bands loosely surrounding said disks and attached at one end to the belt wheel, means coöperating with said cone for locking either of the bands with its respective disk and means coöperating with said disks whereby the shaft may be driven in reverse direction when one of the disks is locked with the belt wheel.

4. In a reversible clutch mechanism, the combination with a shaft, a cone slidable on said shaft, and means to move said cone longitudinally on the shaft, of a hollow belt wheel, sleeves extending into said belt wheel, means to key one of the sleeves to said shaft, a disk carried by each sleeve, one of said disks being keyed to the sleeve attached to the shaft, means operated by said cone for causing the keyed disk and the shaft to rotate with the belt wheel, means operable by said cone for causing the other disk to rotate with said belt wheel, and means between said disks to cause the first disk and shaft to rotate in reverse direction when the last disk is caused to rotate with the belt wheel.

5. In a reversible clutch mechanism, a shaft, a belt wheel rotatable on the shaft, a pair of disks, means for locking the belt wheel to one or the other of said disks, and a gear mechanism for causing reverse rotation of the shaft when one of the disks is locked to the belt wheel.

6. In a reversible clutch mechanism, a shaft, a belt wheel rotatable on said shaft, a pair of disks, one of which is attached to said shaft, bands carried by the belt wheel adapted to cause said disks to rotate with the belt wheel, means for causing said bands to grip said disks, a cone for operating said gripping mechanism, and gears operated by one of said disks for reversing the rotation of said shaft when the last mentioned disk is locked with the belt wheel.

7. In a reversible clutch mechanism, the combination with a shaft, and a belt wheel rotatable thereon, of a disk fixed to said shaft, a band surrounding said disk and carried by said belt wheel, a shaft having a cam thereon for causing said band to grip said disk, a cone structure on said shaft, a finger attached to the cam shaft and adapted to coöperate with said cone for operating said band, a second disk rotatable on said first shaft, a band surrounding said second disk, a shaft having a cam adapted to lock said second band with the second disk, a finger on the second cam shaft adapted to be operated by said cone, means to move the cone into engagement with either of said fingers or out of engagement with both of said fingers, and means between said disks for reversing rotation of the first shaft when one of the disks is locked with the belt wheel.

8. In a reversible clutch mechanism, the combination with a shaft, and a belt wheel rotatable thereon, said belt wheel having a cavity therein forming an oiling chamber, of a pair of disks within said belt wheel, means to lock either of said disks with the belt wheel, and means connected with the disks for reversing the rotation of the shaft when one of the disks is locked with the belt wheel.

In witness whereof, I have hereunto affixed my signature in the presence of the witnesses herein named.

JAMES F. STANLEY.

Witnesses:
 JOHN H. CAVE,
 HARRY R. ROBINETT.